(No Model.)

A. A. HOUGHTON.
COUNTER SCALE.

No. 276,180. Patented Apr. 24, 1883.

Witnesses.
Ann W. Sangster.
J. M. Caldwell.

Inventor.
Alfred A. Houghton.
By James Sangster
Atty

UNITED STATES PATENT OFFICE.

ALFRED A. HOUGHTON, OF BUFFALO, NEW YORK.

COUNTER-SCALE.

SPECIFICATION forming part of Letters Patent No. 276,180, dated April 24, 1883.

Application filed January 13, 1883. (No model.)

*To all whom it may concern:*

Be it known that I, ALFRED A. HOUGHTON, a citizen of the United States, residing in Buffalo, in the county of Erie and State of New York, have invented certain new and useful Improvements in Counter-Scales, of which the following is a specification.

My invention relates to a counter-scale having the beam arranged directly over the platform, at a convenient height and position to adapt it to be easily operated and examined, and out of the way, so that it will not interfere with weighing very high packages or bags, all of which will be clearly and fully hereinafter described by reference to the accompanying drawings, in which—

Figure 1:
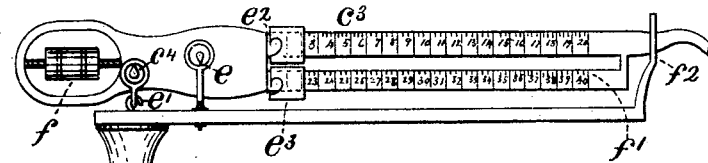
Figure 2:
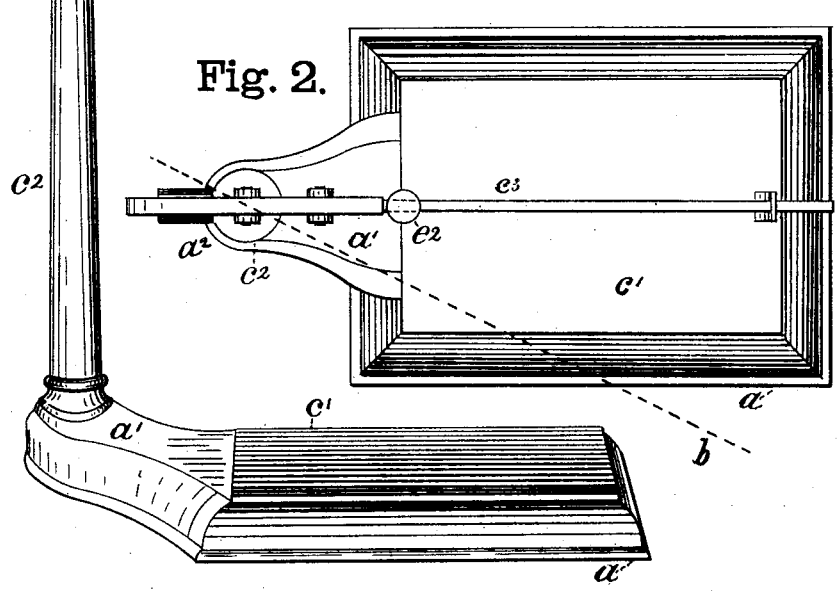
Figure 3:
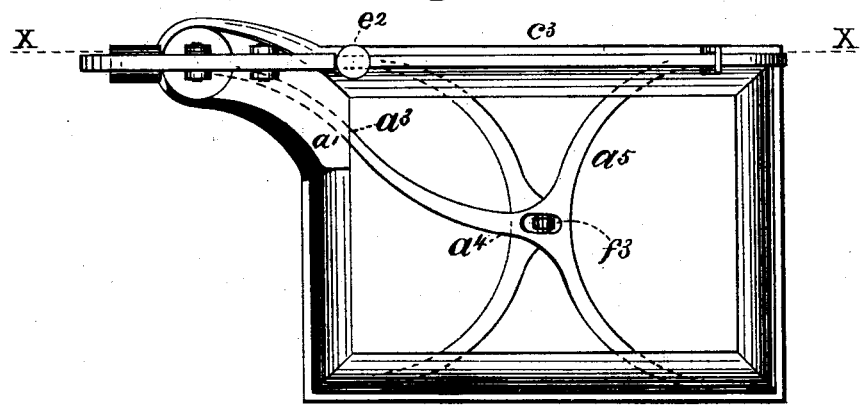

Figure 1 is a perspective view of a scale complete made according to my invention. Fig. 2 represents a top view, showing the beam arranged directly over the center of the platform, or nearly so; and Fig. 3 is a top view, showing the beam arranged over one side of the platform-base, the platform being removed, so as to expose the weighing-levers.

The base $a$ of the scale is provided with a hollow projecting portion, $a'$, preferably arranged at one corner instead of at or near the center, $a^2$, as shown in Fig. 2. The object in placing the hollow portion $a'$ on one side or corner of the base $a$ is to adapt it to receive the curved end $a^3$ of the long lever $a^4$, and thereby permit the scale-beam $c^3$ to be at one side of the platform $c'$, so as to be entirely out of the way of high packages and still be over the platform in a convenient position to be examined during the operation of weighing. The beams may be placed over the platform at or near the center, as shown in Fig. 2, but it would not be so well adapted for weighing high packages as it would be if arranged as shown in Fig. 3; or it may be arranged diagonally across the platform, as shown by the dotted lines $b$ in Fig. 2, but it would not be as desirable as the construction shown in Figs. 1 and 3. The long-lever pivots on the curved end should be just within the line X X, Fig. 2, or slightly within the fulcrum and bearing pivots on the long lever, or that side of the platform, so as to avoid all danger of tipping. The fulcrum and bearing pivots on the long lever $a^4$ and short lever $a^5$ within the platform are made in the well-known way, and do not require any further description here. Column $c^2$ is made high enough to bring the beams $c^3$ in a suitable position so that the figures on them can be easily seen without stooping when the scale is placed upon a counter for use. The beams $c^3$ are made and connected by pivots $c^4$ $e$ and the steelyard-rod $e'$ in the ordinary and well-known way, and are provided with the usual poises, $e^2$ $e^3$, and with a balance ball or weight, $f$. The steelyard-rod $e'$ connects in the usual way at the lower end by means of the well-known pivots to the end of the curved portion $a^3$ of the long lever.

I claim—

1. A counter-scale provided with a hollow projecting portion, $a'$, arranged on one corner of the base, substantially as specified, in combination with the long lever having a curved portion, $a^3$, adapted to connect by the usual pivots and steelyard-rod $e'$ to the beam, substantially as described.

2. A platform counter-scale provided with a base, $a$, having a hollow projecting portion, $a'$, arranged at one corner of the base, in combination with the short lever $a^5$, long lever $a^4$, provided with the curved portion $a^3$, the usual bearing and fulcrum pivots, a steelyard-rod, $e'$, and beams $e^3$, provided with the usual connecting-pivots and weighing-poises, substantially as specified.

ALFRED A. HOUGHTON.

Witnesses:
J. M. CALDWELL,
JAMES SANGSTER.